US012652619B2

(12) United States Patent
Li

(10) Patent No.: US 12,652,619 B2
(45) Date of Patent: Jun. 9, 2026

(54) METHOD AND APPARATUS FOR DETERMINING POWER-SAVING SIGNAL, COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 356 days.

(21) Appl. No.: 18/274,085

(22) PCT Filed: Jan. 27, 2021

(86) PCT No.: PCT/CN2021/074014
§ 371 (c)(1),
(2) Date: Jul. 25, 2023

(87) PCT Pub. No.: WO2022/160144
PCT Pub. Date: Aug. 4, 2022

(65) Prior Publication Data
US 2024/0422680 A1 Dec. 19, 2024

(51) Int. Cl.
*H04W 52/02* (2009.01)
*H04L 5/00* (2006.01)
*H04W 8/22* (2009.01)
*H04W 68/02* (2009.01)

(52) U.S. Cl.
CPC ....... *H04W 52/0235* (2013.01); *H04L 5/0051* (2013.01); *H04W 8/22* (2013.01); *H04W 68/02* (2013.01)

(58) Field of Classification Search
None
See application file for complete search history.

(56) References Cited

U.S. PATENT DOCUMENTS

| | | | | |
|---|---|---|---|---|
| 6,018,642 A | * | 1/2000 | Adachi | ............. H04W 52/0216 455/574 |
| 11,902,897 B2 | * | 2/2024 | Xu | ......................... H04W 72/23 |
| 2015/0105062 A1 | * | 4/2015 | Quan | .................... H04W 76/27 455/418 |

(Continued)

FOREIGN PATENT DOCUMENTS

| | | |
|---|---|---|
| CN | 103636281 A | 3/2014 |
| CN | 107371152 A | 11/2017 |

(Continued)

OTHER PUBLICATIONS

Moderator (Samsung),"Summary for TRS/CSI-RS occasion(s) for idle/inactive UEs",3GPP TSG RAN WG1 #102-e,R1-200xxxx,e-Meeting, Aug. 17-28, 2020.

(Continued)

*Primary Examiner* — Eunsook Choi
(74) *Attorney, Agent, or Firm* — Volpe Koenig

(57) ABSTRACT

A method for determining a power-saving signal, includes: sending first auxiliary information of a terminal in a case that use of an additional reference symbols is supported, the first auxiliary information being configured to determine a first power-saving signal supported by the terminal, and the first power-saving signal being configured for the terminal to monitor a paging message.

20 Claims, 6 Drawing Sheets

Terminal

Network device

S101, send first auxiliary information of the terminal in a case that use of an additional reference symbol is supported

(56) References Cited

U.S. PATENT DOCUMENTS

| | | | | |
|---|---|---|---|---|
| 2018/0077624 A1* | 3/2018 | Jung | H04W 36/385 | |
| 2020/0145921 A1* | 5/2020 | Zhang | H04W 52/0235 | |
| 2021/0204216 A1* | 7/2021 | Yang | H04W 52/0274 | |
| 2022/0015034 A1* | 1/2022 | Miao | H04W 72/23 | |
| 2022/0132425 A1* | 4/2022 | Seo | H04W 52/02 | |
| 2023/0117840 A1* | 4/2023 | He | H04W 68/02 | |
| | | | 370/318 | |
| 2024/0064641 A1* | 2/2024 | Li | H04W 68/025 | |

FOREIGN PATENT DOCUMENTS

| | | |
|---|---|---|
| CN | 110536387 A | 12/2019 |
| CN | 110754117 A | 2/2020 |
| CN | 110999191 A | 4/2020 |
| CN | 111246503 A | 6/2020 |
| CN | 111436099 A | 7/2020 |
| CN | 111566974 A | 8/2020 |
| CN | 111670604 A | 9/2020 |
| CN | 112075104 A | 12/2020 |
| CN | 112087292 A | 12/2020 |
| CN | 112153724 A | 12/2020 |
| KR | 1020190013636 A2 | 2/2019 |
| WO | 2020030738 A1 | 2/2020 |
| WO | 2020164638 A1 | 8/2020 |
| WO | 2020168330 A1 | 8/2020 |
| WO | 2020222509 A1 | 11/2020 |

OTHER PUBLICATIONS

Moderator (Samsung),"Moderator summary for TRS/CSI-RS occasion(s) for idle/inactive UEs",3GPP TSG RAN WG1 #103-e, R1-200xxxx,e-Meeting, Oct. 26-Nov. 13, 2020.

Xiaomi,"TRS/CSI-RS occasion(s) for idle/inactive UEs",3GPP TSG RAN WG1 #103,R1-2007899,e-Meeting, Oct. 26-Nov. 13, 2020.

Moderator (Samsung),"Moderator summary for TRS/CSI-RS occasion(s) for idle/inactive UEs", 3GPP TSG RAN WG1 #103-e,R1-2008178,e-Meeting, Oct. 26- Nov. 13, 2020.

Nokia, Nokia Shanghai Bell,"On RS information to Idle/Inactive mode UEs",3GPP TSG RAN WG1 #103-e, R1-2008934,e-Meeting, Oct. 26- Nov. 13, 2020.

Vivo,"Paging enhancements for idle/inactive mode UE power saving",3GPP TSG RAN WG1#104-e,R1-2100452,e-6 Meeting, Jan. 25-Feb. 5, 2021.

3GPP, "Final Report of 3GPP TSG RAN WG1 #102-e v1.0.0", 3GPP TSG RAN WG1 Meeting #103-e, R1-2007501, Oct. 26, 2020, Section 8.7.1, Type-A.

3GPP, "Final Report of 3GPP TSG RAN WG1 #103-e v1.0.0", 3GPP TSG RAN WG1 Meeting #104-e, R1-2100001, Jan. 25, 2021, Section 8.7.1, Type-A.

* cited by examiner

Terminal

Network device

S101, send first auxiliary information of the terminal in a case that use of an additional reference symbol is supported

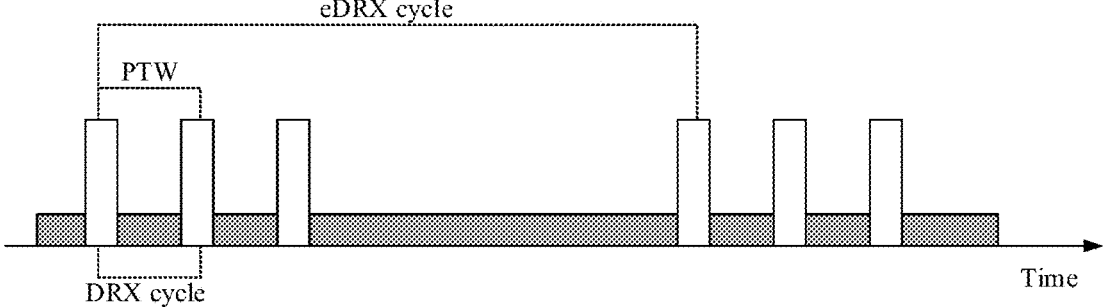
Fig. 7
Apparatus 800
Sending module 801
Fig. 8
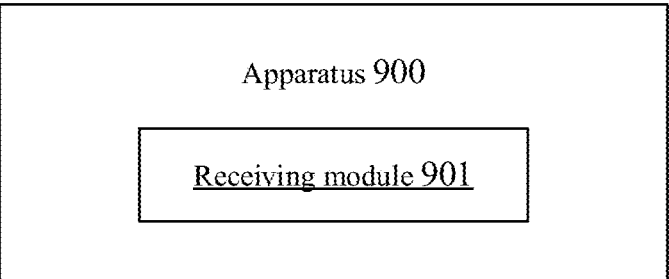
Fig. 9

METHOD AND APPARATUS FOR DETERMINING POWER-SAVING SIGNAL, COMMUNICATION DEVICE AND STORAGE MEDIUM

CROSS REFERENCE TO RELATED APPLICATION

The present application is a U.S. National Stage of International Application No. PCT/CN2021/074014, filed on Jan. 27, 2021, the contents of all of which are incorporated herein by reference in its entirety for all purposes.

BACKGROUND

In a scenario of discontinuous reception (DRX), a terminal monitors a physical downlink control channel (PDCCH) during an activation period of the DRX corresponding to the terminal, so as to realize the purpose of reducing power consumption.

SUMMARY

According to a first aspect of an example of the present disclosure, a method for determining a power-saving signal is provided and performed by a terminal, including: sending first auxiliary information of the terminal in a case that use of an additional reference symbol is supported, the first auxiliary information being configured to determine a first power-saving signal supported by the terminal, and the first power-saving signal being configured for the terminal to monitor a paging message.

According to a second aspect of an example of the present disclosure, a method for determining a power-saving signal is provided and performed by a network device, including: receiving, first auxiliary information of a terminal in a case that use of an additional reference symbol is supported, the first auxiliary information being configured to determine a first power-saving signal supported by the terminal, and the first power-saving signal being configured for the terminal to monitor a paging message.

According to a third aspect of an example of the present disclosure, a communication device is provided, at least including: a processor and an interface circuit; the interface circuit is configured to receive and transmit code instructions to the processor; and the processor is configured to run the code instructions to execute steps in any of the above method.

According to a fourth aspect of an example of the present disclosure, a non-transitory computer readable storage medium is provided, storing a computer-executable instruction, and the instruction, when executed, is configured to implement steps in any above method.

BRIEF DESCRIPTION OF THE DRAWINGS

The accompanying drawings here are incorporated into the specification and constitute a part of the specification, showing the principles consistent with the examples of the present disclosure and used together with the specification to explain the examples of the present disclosure.

FIG. 7 is a schematic diagram of a DRX mode illustrated according to an example.

FIG. 8 is a first structural block diagram of an apparatus for determining a power-saving signal illustrated according to an example.

FIG. 9 is a second structural block diagram of an apparatus for determining a power-saving signal illustrated according to an example.

DETAILED DESCRIPTION

Figures 1, 2:
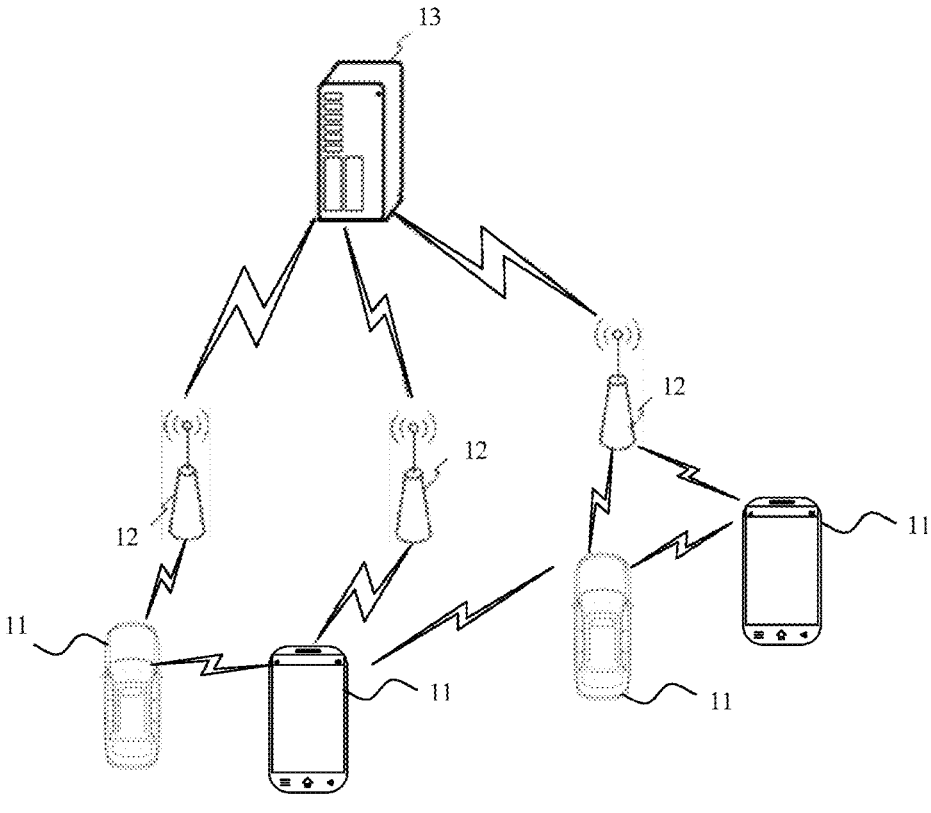
FIG. 1 is a schematic structural diagram of a wireless communication system illustrated according to an example.
FIG. 2 is a first schematic flow chart of a method for determining a power-saving signal illustrated according to an example.

Examples will be described in detail here, and their instances are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the present disclosure. Rather, they are merely instances of apparatuses and methods consistent with some aspects of the examples of the present disclosure as detailed in the appended claims.

The terms used in the examples of the present disclosure are merely for the purpose of describing specific examples, and are not intended to limit the examples of the present disclosure. The singular forms "one" and "the" used in the examples of the present disclosure and the appended claims are also intended to include the plural forms unless the context clearly indicates other meanings. It also needs to be understood that the term "and/or" as used here refers to and includes any or all possible combinations of one or more associated listed items.

It needs to be understood that although the terms first, second, third, etc. may be used to describe various information in the examples of the present disclosure, such information is not to be limited to these terms. These terms are merely used to distinguish the same type of information from each other. For example, without departing from the scope of the examples of the present disclosure, first information may also be referred to as second information, and similarly, the second information may also be referred to as the first information. Depending on the context, the words "if" and "as if" as used here can be interpreted as "at the time . . . " or "when . . . " or "in response to determining".

Examples of the present disclosure relate to the field of wireless communication, in particular to a method and apparatus for determining a power-saving signal, a communication device, and a storage medium.

In a scenario of discontinuous reception (DRX), a terminal monitors a physical downlink control channel (PDCCH)

during an activation period of the DRX corresponding to the terminal, so as to realize the purpose of reducing power consumption.

In an idle state and other states, additional reference symbols are used to assist the terminal in information acquisition, time-frequency domain synchronization, and the like. Compared to synchronization signal block (SSB) synchronization, synchronization may be performed at a position closer to a paging occasion by using the additional reference symbols, so that more power can be saved. However, there is no better power saving mechanism for situations where additional reference symbols are introduced.

To better describe any example of the present disclosure, an example of the present disclosure takes an application scenario of access control as an example for illustrative explanation.

FIG. 1 illustrates a schematic structural diagram of a wireless communication system provided by an example of the present disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be internet of things terminals, such as sensor devices, mobile phones (or called "cellular" phones), and computers with internet of things terminals. For example, the terminals may be fixed, portable, pocket-size, handheld, computer built-in or vehicle-mounted apparatuses, for example, a station (STA), a subscriber unit, a subscriber station, a mobile station, a mobile, a remote station, an access point, a remote terminal, an access terminal, a user terminal, a user agent, a user device, or user equipment. Or, the terminals 11 may also be unmanned aircraft devices. Or, the terminals 11 may also be vehicle-mounted devices, such as a trip computer with a wireless communication function, or a wireless terminal connected with an external trip computer. Or, the terminals 11 may also be infrastructure, such as a street lamp, a signal light, or other infrastructure with wireless communication functions.

The base stations 12 may be network side devices in the wireless communication system. The wireless communication system may be the 4th generation mobile communication (4G) system, also called a long term evolution (LTE) system; or, the wireless communication system may also be a 5G system, also called a new radio (NR) system or a 5G NR system. Or, the wireless communication system may also be a next-generation system of the 5G system. An access network in the 5G system may be called a new generation-radio access network (NG-RAN).

The base stations 12 may be evolved base stations (eNB) adopted in the 4G system. Or, the base stations 12 may also be base stations adopting centralized and distributed architectures (gNB) in the 5G system. When the base stations 12 adopt the centralized and distributed architectures, they typically each include a central unit (CU) and at least two distributed units (DUs). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the example of the present disclosure.

The base stations 12 and the terminals 11 may establish a wireless connection through a wireless radio. In different implementations, the wireless radio is a wireless radio based on the 4G standard; or, the wireless radio is a wireless radio based on the 5G standard, such as new radio; or, the wireless radio may also be a wireless radio based on the next-generation mobile communication standard of 5G.

In some examples, end to end (E2E) connection may also be established among the terminals 11, for example, vehicle to vehicle (V2V) communication, vehicle to infrastructure (V2I) communication, and vehicle to pedestrian (V2P) communication in vehicle to everything (V2X) communication and other scenarios.

In some examples, the above wireless communication system may further include a network management device 13.

The plurality of base stations 12 is connected with the network management device 13, respectively. The network management device 13 may be a core network device in the wireless communication system, for example, the network management device 13 may be a mobility management entity (MME) in an evolved packet core (EPC). Or, the network management device may also be other core network devices, such as a serving gateway (SGW), a public data network gateway (PGW), a policy and charging rules function (PCRF), or a home subscriber server (HSS). The implementation form of the network management device 13 is not limited to the example of the present disclosure.

As shown in FIG. 2, an example of the present disclosure provides a method for determining a power-saving signal, performed by a terminal, and including step S101.

In step S101, first auxiliary information of the terminal in a case that use of an additional reference symbol is supported is sent. The first auxiliary information is configured to determine a first power-saving signal supported by the terminal, and the first power-saving signal is configured for the terminal to monitor a paging message.

The terminal may send the first auxiliary information to a network device (such as a base station), and the first auxiliary information may be used by the network device to configure the power-saving signals for the terminal. For example, the first auxiliary information sent by the terminal may include a range of the power-saving signals supported by the terminal, or values of positions where the supported power-saving signals are located, or the like. In this way, the network device may configure corresponding power-saving signals according to the first auxiliary information.

In the example of the present disclosure, the first auxiliary information is auxiliary information configured for the terminal, in a case that the use of the additional reference symbol is supported, to inform the network device of the power-saving signal supported by the terminal. When the terminal supports the use of the additional reference symbol, the additional reference symbol may be configured to assist in channel state information acquisition or time-frequency domain synchronization of a network, radio resource management (RRM) measurement, and the like. When the additional reference symbol is configured for time-frequency domain synchronization, compared to SSB synchronization, a configuration position of the additional reference symbol is closer to a PO, so the terminal may wake up later. Thus, there may be differences between the power-saving signals supported when the terminal supports the use of the additional reference symbol and when the terminal does not support the use of the additional reference symbol.

Thus, in the example of the present disclosure, the terminal sends the first auxiliary information of the power-saving signal supported by the terminal in a case that the use of the additional reference symbol is supported, which is distinguished from a case that the use of the additional reference symbol is not supported, so that the network device conveniently configures the power-saving signal of the terminal correspondingly, the terminal may cooperate with the additional reference symbol to monitor the power-saving signal, and more power can be saved.

In some examples, the first power-saving signal is further configured for the terminal to monitor the paging message in an inactive state and/or an idle state.

In the example of the present disclosure, the first power-saving signal is configured for the terminal to determine whether and when to monitor paging in the idle state and the inactive state. For example, the terminal detects the first power-saving signal, if the first power-saving signal is detected, the paging message is monitored in a next monitoring cycle. Conversely, if the first power-saving signal is not detected, the next monitoring cycle is skipped, and the paging message is not monitored.

For another example, the terminal detects the power-saving signal, the paging message is monitored in next N monitoring cycles, if the first power-saving signal is not detected before an $(N+1)^{th}$ paging cycle, the paging cycle is skipped, and the paging message is not monitored.

In this way, the terminal may selectively monitor paging based on the first power-saving signal. Based on this, unnecessary monitoring is reduced, and a purpose of reducing power consumption is achieved.

In some examples, the additional reference symbol is configured to assist in time-frequency domain synchronization between the terminal and a network device, and the additional reference symbol includes at least one of the following: a TRS and a CSI-RS.

In the example of the present disclosure, the additional reference symbol supported by the terminal includes the CSI-RS, which is mainly configured to obtain channel state information, beam management, time-frequency tracking, mobility management, and rate matching of a downlink and the like.

The additional reference symbol may further include the TRS, and the TRS is also a type of CSI-RS and is configured to track a time-frequency domain, as well as compensating for time and frequency offsets and the like.

Thus, the terminal may use the additional reference symbol to assist in time-frequency domain synchronization with the network.

Figure 3:
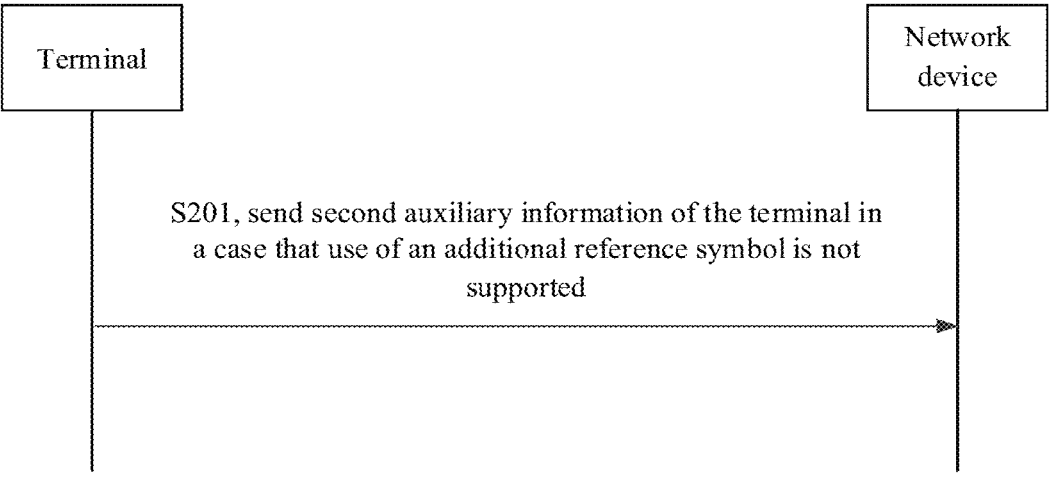
FIG. 3 is a second schematic flow chart of a method for determining a power-saving signal illustrated according to an example.

As shown in FIG. 3, an example of the present disclosure provides a method for determining a power-saving signal, performed by a terminal, and including step S201.

In step S201, second auxiliary information of the terminal in a case that the use of the additional reference symbol is not supported is sent. The second auxiliary information is configured to determine a second power-saving signal.

In the example of the present disclosure, the terminal may also not support the use of the additional reference symbol mentioned in the above example. For a case where the use of the additional reference symbol is not supported, the capability of the terminal to support the power-saving signal may also differ from the case where the use of the additional reference symbol is supported. Thus, the terminal may report the second auxiliary information of the second power-saving signal supported by the terminal in the case that the use of the additional reference symbol is not supported by the network device.

In one example, the terminal may report the first auxiliary information in the case that the additional reference symbol is supported and the second auxiliary information in the case that the additional reference symbol is not supported respectively, so that the network device configures configuration information for the power-saving signal in both cases for the terminal, the terminal monitors the power-saving signal with different parameters in different cases conveniently, and the application scenario and range of the power-saving signal are improved.

In some examples, sending the first auxiliary information includes: capability reporting information is sent to the network device, the capability reporting information including the first auxiliary information; and sending the second auxiliary information includes: the capability reporting information is sent to the network device, the capability reporting information including the second auxiliary information.

In the example of the present disclosure, the terminal may report the above auxiliary information when reporting its own capability; that is, the above capability reporting information is configured to send the first auxiliary information and/or the second auxiliary information. For example, the auxiliary information is carried in a terminal capability of UE-RadioPagingInfo (terminal paging information) to be reported to the base station.

In this way, the terminal does not require additional signaling and may use the existing reported information to carry and send the auxiliary information to the network device, such as the base station.

Figure 4:
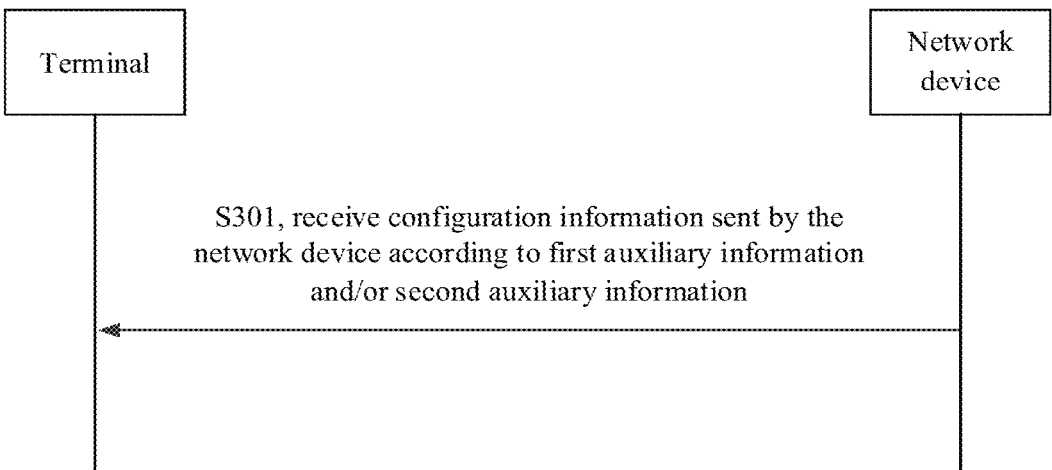
FIG. 4 is a third schematic flow chart of a method for determining a power-saving signal illustrated according to an example.

As shown in FIG. 4, an example of the present disclosure provides a method for determining a power-saving signal, performed by a terminal, and including step S301.

In step S301, configuration information sent by the network device according to the first auxiliary information and/or the second auxiliary information is received. The configuration information includes an offset of the power-saving signal relative to a paging occasion (PO).

Here, the configuration information is configured to configure the power-saving signal, and the terminal may determine the way to wake up the terminal according to the power-saving signal and monitor a paging message according to the configuration of the configuration information.

For example, the configuration information of the power-saving signal received by the terminal is configured with an offset between the position of the power-saving signal and the PO, and then the terminal may determine the position of the power-saving signal according to the configuration information and a position of the PO. In this way, the terminal may be woken up according to the position of the power-saving signal, monitor the power-saving signal, and if the power-saving signal is monitored, the paging message may be further received. If the configuration information is not configured with the power-saving signal in some paging cycles, the terminal may not be woken up, so as to skip monitoring of the paging message. In this way, the terminal may reduce unnecessary paging monitoring, so as to achieve the purpose of reducing the power consumption.

In some examples, the configuration information is read by the terminal from broadcast signaling of the network device, or the configuration information is read by the terminal from dedicated signaling specifically configured to carry the configuration information.

The above configuration information may be sent by the broadcast signaling of the base station to the terminal, and may also be sent by the dedicated signaling of the base station to the terminal. For example, the base station carries the above first configuration information and the second configuration information both in the same broadcast signaling to send to the terminal, or carries them in different broadcast signaling respectively to send to the terminal sequentially. In another example, the base station carries the first configuration information in the broadcast signaling to send to the terminal, and carries the second configuration information in the dedicated signaling to send to the terminal. In yet another example, the base station carries the first configuration information and the second configuration information in different dedicated signaling, respectively, to send to the terminal sequentially, etc.

In addition, the above first configuration information and the second configuration information may also be agreed upon by a protocol, or by the protocol on how the network device sends them to the terminal.

In some examples, the configuration information includes: first configuration information of the first power-saving signal and/or second configuration information of the second power-saving signal.

In the example of the present disclosure, the above configuration information may be the first configuration information configured to configure the first power-saving signal and/or the second configuration information configured to configure the second power-saving signal carried in the same message. The above configuration information may also be the first configuration information carried in a separate message and configured to separately configure the first power-saving signal, and/or the second configuration information carried in a separate message and configured to separately configure the second power-saving signal.

In the example of the present disclosure, for the two cases that the terminal supports the use of the additional reference symbol and does not support the use of the additional reference symbol, there may be different auxiliary information (namely, the above first configuration information and the second configuration information), so as to obtain different configuration information. Namely, the above first configuration information for the first power-saving signal and the second configuration information for the second power-saving signal.

Thus, the terminal may obtain the configuration information corresponding to the network device. The network device may carry the above first configuration information and the second configuration information in the same message to send to the terminal, and may also send the first configuration information and the second configuration information separately to the terminal in separate messages. The terminal may obtain the first configuration information and the second configuration information, respectively, through received messages, and monitor the corresponding power-saving signals according to different configuration information in different use cases for the additional reference symbol.

In some examples, the method further includes: position information of the first power-saving signal is determined according to the first configuration information; and/or position information of the second power-saving signal is determined according to the second configuration information; and the paging message is monitored according to the position information of the first power-saving signal and/or the position information of the second power-saving signal.

Here, the position information of the power-saving signal in different cases may be determined according to the first configuration information and the second configuration information.

For example, the configuration information of the power-saving signal received by the terminal is configured with an offset between the position of the power-saving signal and the PO, and then the terminal may determine the position of the power-saving signal according to the configuration information and a position of the PO. In this way, the terminal may be woken up according to the position of the power-saving signal, monitor the power-saving signal, and if the power-saving signal is monitored, the paging message may be further received. If the configuration information is not configured with the power-saving signal in some paging cycles, the terminal may not be woken up, so as to skip monitoring of the paging message. In this way, the terminal may reduce unnecessary paging monitoring, so as to achieve the purpose of reducing the power consumption.

In some examples, determining the position information of the first power-saving signal according to the first configuration information includes: in response to receiving the first configuration information, it is determined that the first power-saving signal is valid; and in response to the first power-saving signal being valid, the position information of the first power-saving signal is determined according to the first configuration information.

In the example of the present disclosure, the terminal may immediately apply the first configuration information when receiving the first configuration information of the first power-saving signal. That is, when receiving the first configuration information, the first power-saving signal corresponding to the configuration information is valid by default.

Thus, if the terminal receives the first configuration information for configuring the above first power-saving signal, the first power-saving signal is valid. At this time, the terminal may determine the position information of the first power-saving signal according to the first configuration information, so as to monitor the paging message according to the first power-saving signal.

Further, if the terminal receives the configuration information of the second power-saving signal, the second power-saving signal is valid, and the terminal may monitor the paging message according to the second power-saving signal. In one example, if the terminal receives the first configuration information of the first power-saving signal, and also receives the second configuration information of the second power-saving signal, since the first power-saving signal is a power-saving signal corresponding to a case that the terminal supports the additional reference symbol, which has better power-saving performance, and at this time, the terminal supports the additional reference symbol, the terminal may consider that the first power-saving signal is valid, and prioritize the monitoring of paging according to the first power-saving signal.

In some examples, determining the position information of the first power-saving signal according to the first configuration information includes: in response to receiving a notification message notifying that the first power-saving signal is valid, it is determined that the first power-saving signal is valid; and in response to the first power-saving signal being valid, the position information of the first power-saving signal is determined according to the first configuration information.

In the example of the present disclosure, if the terminal receives the first configuration information of the first power-saving signal, the power-saving signal may not be monitored immediately according to the first configuration information, but it continues to use the second configuration information (namely the case that the use of the additional reference symbol is not supported) of the second power-saving signal for monitoring. Whether the first power-saving signal is valid is determined according to the notification message sent by the network device. That is to say, when the terminal receives the notification message that the first power-saving signal is valid, it is determined that the first power-saving signal is valid, so that the position information of the first power-saving signal is determined according to the corresponding configuration information, and the paging message is monitored based on the first power-saving signal.

In some examples, the method further includes: in response to the first power-saving signal being invalid, it returns to determine the position information of the second power-saving signal according to an offset corresponding to the second configuration information.

In the example of the present disclosure, the terminal may have already obtained the first configuration information of the first power-saving signal and the second configuration information of the second power-saving signal, or may not obtain the first configuration information (for example, the second configuration information corresponding to the case that the additional reference symbol is not supported is merely obtained). If the first power-saving signal is invalid, that is, the notification message indicating that the first power-saving signal is valid is not received, at this time, the terminal cannot monitor according to the position information of the first power-saving signal. Thus, the first power-saving signal is returned to determine the position information of the power-saving signal according to the offset corresponding to the second configuration information. A case where the terminal does not support the use of the additional reference symbol currently is an example of not receiving the notification message indicating that the first power-saving signal is valid.

Figure 5:
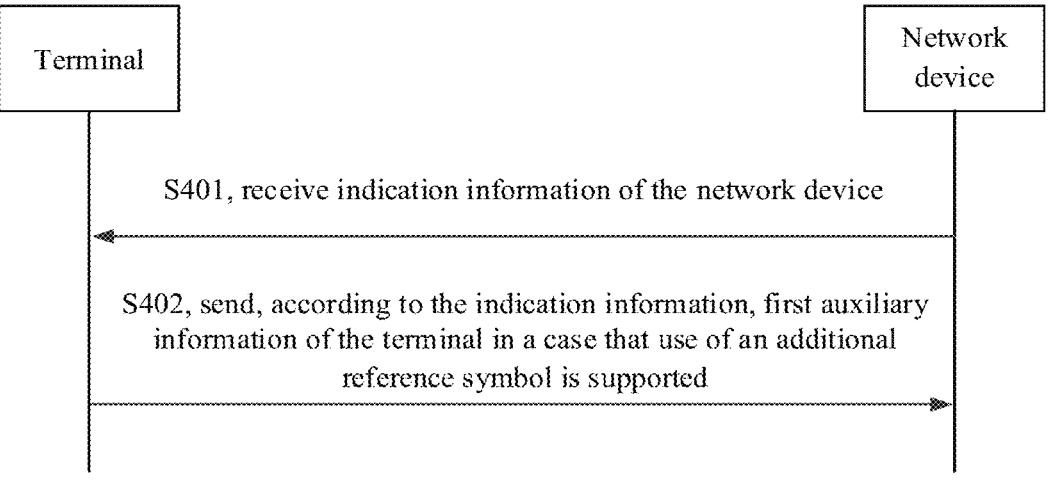
FIG. 5 is a fourth schematic flow chart of a method for determining a power-saving signal illustrated according to an example.

As shown in FIG. 5, an example of the present disclosure provides a method for determining a power-saving signal, performed by a terminal, and including steps S401 and S402.

In step S401, indication information of a network device is received.

In step S402, according to the indication information, the first auxiliary information of the terminal in a case that the use of the additional reference symbol is supported is sent to the network device.

The terminal may send the first auxiliary information to the network device based on an indication of the network device, for example, a base station indicates that the terminal report the first auxiliary information. Then the terminal reports the first auxiliary information corresponding to the case that the use of the additional reference symbol is supported based on a capability state of the terminal. For example, the network device may indicate the terminal to report the corresponding auxiliary information in a case of indicating that the terminal supports the use of the additional reference symbol or in other cases, for example, in a case that the terminal does not support the use of the additional reference symbol, the network device indicates the terminal to report the auxiliary information corresponding to the cases of supporting and/or not supporting the use of the additional reference symbol respectively.

In other examples, the terminal may also report the above first auxiliary information according to rules agreed by a protocol without being indicated by the network device. In addition, the terminal may further report the second auxiliary information based on the indication of the network device. That is, the terminal needs to determine whether the network device supports a characteristic of configuring based on the auxiliary information, so as to report the auxiliary information based on the indication of the network device.

In some examples, receiving the indication information of the network device includes at least one of the following: broadcast signaling sent by the network device is received, and the indication information is obtained from the broadcast signaling; and dedicated signaling specifically configured to carry the indication information sent by the network device is received, and the indication information is obtained from the dedicated signaling.

In the example of the present disclosure, the above indication information may be carried in the broadcast signaling or the dedicated signaling, and the dedicated signaling is signaling specifically configured to carry the indication information and send it to the terminal. When receiving the above broadcast signaling or the dedicated signaling, the terminal may read the indication information carried in the broadcast signaling or the dedicated signaling, and report the first auxiliary information based on the indication information.

In some examples, the terminal sends, in response to the indication information being configured to indicate to the terminal that the additional reference symbol, according to the indication information, the first auxiliary information of the terminal, in a case that the use of the additional reference symbol is supported.

The above indication information may be information configured to indicate the terminal to support the additional reference symbol, and if the terminal receives the indication information, it is determined that the corresponding first auxiliary information needs to be reported. That is to say, the above indication information does not need to carry a field that clearly indicates the terminal to report the first auxiliary information, but implicitly indicates the terminal to report. The terminal confirms that it supports the additional reference symbol according to the indication information, and then reports the first auxiliary information correspondingly.

In some examples, in response to the indication information being configured to indicate that the terminal supports the use of the additional reference symbol and use of the power-saving signal are supported, according to the indication information, the terminal sends the first auxiliary information of the terminal in a case where the use of the additional reference symbol is supported.

In the example of the present disclosure, the above indication information may further be configured to indicate the terminal to support the use of the additional reference symbol and the use of the power-saving signal at the same time. The terminal may determine to use the additional reference symbol to assist in synchronization based on the indication information, and meanwhile use the power-saving signal to monitor paging.

At this time, the terminal may report the first auxiliary information corresponding to the case where the use of the additional reference symbol is supported without obtaining a clear indication for reporting the auxiliary information. That is to say, the indication information here implicitly indicates the terminal to report the first auxiliary information. Thus, the terminal does not need to additionally receive other information for indicating the reporting of the first auxiliary information.

Figure 6:
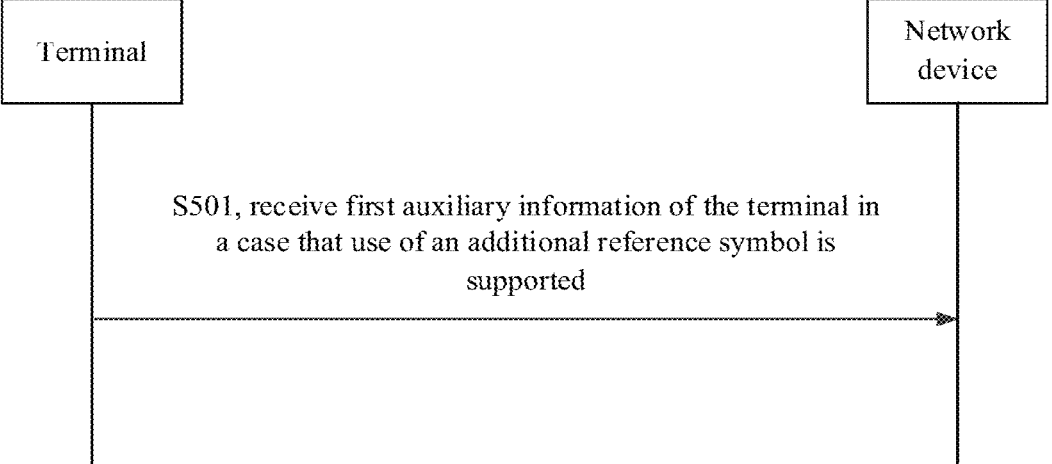
FIG. 6 is a fifth schematic flow chart of a method for determining a power-saving signal illustrated according to an example.

As shown in FIG. 6, an example of the present disclosure provides a method for determining a power-saving signal, performed by a network device, and including step S501.

In step S501, first auxiliary information of a terminal in a case that use of an additional reference symbol is supported is received. The first auxiliary information is configured to determine a first power-saving signal supported by the terminal, and the first power-saving signal is configured for the terminal to monitor a paging message.

In the example of the present disclosure, the network device (such as a base station) may receive the first auxiliary information sent by the terminal, and configure the terminal with the power-saving signal according to the first auxiliary information. For example, the first auxiliary information sent by the terminal may include a range of the power-saving signals supported by the terminal, or values of positions where the supported power-saving signals are located, or the like. In this way, the network device may configure corresponding power-saving signals according to the first auxiliary information.

In the example of the present disclosure, the first auxiliary information is auxiliary information configured for the terminal, in a case that the use of the additional reference symbol is supported, to inform the network device of the power-saving signal supported by the terminal. When the terminal supports the use of the additional reference symbol, the additional reference symbol may be configured to assist in channel state information acquisition or time-frequency domain synchronization of a network, RRM measurement, and the like. When the additional reference symbol is configured for time-frequency domain synchronization, compared to SSB synchronization, a configuration position of the additional reference symbol is closer to a PO, so the terminal may wake up later. Thus, there may be differences between the power-saving signals supported when the terminal supports the use of the additional reference symbol and when the terminal does not support the use of the additional reference symbol.

Thus, in the example of the present disclosure, the network device receives the first auxiliary information of the power-saving signal supported by the terminal in a case that the use of the additional reference symbol is supported, which is distinguished from a case that the use of the additional reference symbol is not supported, so that the power-saving signal of the terminal is configured conveniently and correspondingly, the terminal may cooperate with the additional reference symbol to monitor the power-saving signal, and more power can be saved.

In some examples, the first power-saving signal is further configured for the terminal to monitor the paging message in an inactive state and/or an idle state.

In the example of the present disclosure, the first power-saving signal is configured for the terminal to determine whether and when to monitor paging in the idle state and the inactive state. For example, the terminal detects the first power-saving signal, if the first power-saving signal is detected, the paging message is monitored in a next monitoring cycle. Conversely, if the first power-saving signal is not detected, the next monitoring cycle is skipped, and the paging message is not monitored.

For another example, the terminal detects the power-saving signal, the paging message is monitored in next N monitoring cycles, if the first power-saving signal is not detected before an $(N+1)^{th}$ paging cycle, the paging cycle is skipped, and the paging message is not monitored. In this way, the terminal may selectively monitor paging based on the first power-saving signal, so that unnecessary monitoring is reduced, and a purpose of reducing power consumption is achieved.

In some examples, the additional reference symbol is configured for time-frequency domain synchronization between the terminal and the network device, and the additional reference symbol includes at least one of the following: a TRS, or a CSI-RS.

In the example of the present disclosure, the additional reference symbol supported by the terminal includes the CSI-RS, which is mainly configured to obtain channel state information, beam management, time-frequency tracking, mobility management, and rate matching of a downlink and the like.

The additional reference symbol may further include the TRS, and the TRS is also a type of CSI-RS and is configured to track a time-frequency domain, as well as compensating for time and frequency offsets and the like.

Thus, the terminal may use the additional reference symbol to assist in time-frequency domain synchronization with the network.

In some examples, the method further includes: receiving second auxiliary information of the terminal in a case that the use of the additional reference symbol is not supported. The second auxiliary information is configured to determine a second power-saving signal.

In the example of the present disclosure, the terminal may also not support the use of the additional reference symbol mentioned in the above example. For a case where the use of the additional reference symbol is not supported, the capability of the terminal to support the power-saving signal may also differ from the case where the use of the additional reference symbol is supported. Thus, the network device may obtain the second auxiliary information of the second power-saving signal supported by the terminal in the case that the use of the additional reference symbol is not supported.

In one example, the network device may receive the first auxiliary information in the case that the additional reference symbol is supported by the terminal and the second auxiliary information in the case that the additional reference symbol is not supported, respectively, so that the terminal configures configuration information for the power-saving signal in both cases conveniently. Then, the terminal monitors the power-saving signal with different parameters in different cases, and the application scenario and range of the power-saving signal are improved.

In some examples, the method further includes: configuration information sent according to the first auxiliary information and/or the second auxiliary information. The configuration information, including an offset of the power-saving signal relative to a PO.

Here, the configuration information is configured to configure the power-saving signal, the network device sends the configuration information to the terminal based on the auxiliary information provided by the terminal, so that the terminal may determine the way to wake up the terminal according to configuration of the configuration information and monitor a paging message.

For example, the configuration information configures an offset between the position of the power-saving signal and the PO. Then the terminal may determine the position of the power-saving signal according to the configuration information and a position of the PO. In this way, the terminal may be woken up according to the position of the power-saving signal, monitor the power-saving signal, and if the power-saving signal is monitored, the paging message may be further received. If the configuration information is not configured with the power-saving signal in some paging cycles, the terminal may not be woken up, so as to skip monitoring of the paging message. In this way, the terminal may reduce unnecessary paging monitoring, so as to achieve the purpose of reducing the power consumption.

In some examples, sending the configuration information according to the first auxiliary information and/or the second auxiliary information includes at least one of the following: the configuration information is sent through broadcast signaling according to the first auxiliary information and/or the second auxiliary information; or the configuration information is sent through the dedicated signaling specifically configured to carry the configuration information according to the first auxiliary information and/or the second auxiliary information.

The above configuration information may be sent by the broadcast signaling of the base station to the terminal, and may also be sent by the dedicated signaling of the base station to the terminal. For example, the base station carries the above first configuration information and the second configuration information both in the same broadcast signaling to send to the terminal, or carries them in different broadcast signaling respectively to send to the terminal sequentially. In another example, the base station carries the first configuration information in the broadcast signaling to send to the terminal, and carries the second configuration information in the dedicated signaling to send to the terminal. In yet another example, the base station carries the first configuration information and the second configuration information in different dedicated signaling respectively to send to the terminal sequentially, etc.

In addition, the above first configuration information and the second configuration information may also be agreed upon by a protocol, or by the protocol on how the network device sends them to the terminal.

In some examples, the configuration information includes: first configuration information of the first power-saving signal and/or second configuration information of the second power-saving signal.

In the example of the present disclosure, the network device may send the same message carrying the first configuration information of the first power-saving signal and the second configuration information of the second power-saving signal for synchronous configuration to the terminal; or the network device sends a message carrying the first configuration information for separately configuring the first power-saving signal, and/or sends a message carrying the second configuration information for separately configuring the second power-saving signal to the terminal.

In the example of the present disclosure, for the two cases that the terminal supports the use of the additional reference symbol and does not support the use of the additional reference symbol, there may be different auxiliary information (namely, the above first configuration information and the second configuration information). Thus, the network device may provide different configuration information, namely, the above first configuration information for the first power-saving signal and the second configuration information for the second power-saving signal for the terminal, respectively.

The network device may carry the above first configuration information and the second configuration information in the same message to send to the terminal, and may also send the first configuration information and the second configuration information separately to the terminal in separate messages. The terminal may obtain the first configuration information and the second configuration information, respectively, through received messages, and monitor the corresponding power-saving signals according to different configuration information in different use cases for the additional reference symbol.

In some examples, the method further includes at least one of the following: in response to the configuration information at least including the first configuration information.

mation, a notification message notifying that the first power-saving signal is valid does not need to be sent to the terminal, that is, after a configuration message is issued, it implies that the configuration is valid, and it does not need to notify that it is valid through a mode of explicit signaling; or in response to the configuration information at least including the first configuration information, a notification message notifying that the first power-saving signal is valid is sent to the terminal; or in response to the configuration information at least including the first configuration information, a notification message notifying that the additional reference symbol is in an available state is sent to the terminal, where the notification message notifying that the additional reference symbol is in the available state implicitly indicates that the first power-saving signal is valid.

In the example of the present disclosure, if the terminal receives the first configuration information of the first power-saving signal, the power-saving signal may not be monitored immediately according to the first configuration information, but it is continued to use the second configuration information (namely the case that the use of the additional reference symbol is not supported) of the second power-saving signal for monitoring. The network device informs the terminal that the first power-saving signal is valid by sending the notification message. At this time, the terminal may determine the position information of the first power-saving signal according to the corresponding configuration information, and monitor the paging message based on the first power-saving signal.

In the example of the present disclosure, the above notification message may directly inform the terminal that the first power-saving signal is valid through explicit information, for example, if a value of a field of the notification message is 1, it is valid. In addition, the above notification message may be a message for notifying the terminal that the additional reference symbol is in an available state, rather than directly notifying the terminal that the first power-saving signal is valid, but the message implicitly informs the terminal that the first power-saving signal is valid. Thus, if the terminal receives the message that the additional reference symbol is in the available state, it may be determined that the first power-saving signal is valid.

In another example, the network device issues the configuration information to the terminal, when the configuration information contains the first configuration information, it may also imply that the first power-saving signal configured by the first configuration information is valid, and it does not need to send another message notifying that it is valid. At this time, when receiving the configuration information, the terminal may monitor the power-saving signal according to the first configuration information.

In some examples, sending, in response to the configuration information at least including the first configuration information, the notification message notifying that the first power-saving signal is valid to the terminal includes: in response to the configuration information at least including the first configuration information, the notification message notifying that the additional reference symbol is in the available state is sent to the terminal, and the notification message notifying that the first power-saving signal is valid is sent to the terminal.

For example, after the notification message notifying that the additional reference symbol is in the available state is sent, the network device may send the notification message notifying that the first power-saving signal is valid to the terminal; or, the network device may also send the notification message notifying that the first power-saving signal is valid to the terminal while sending the notification message notifying that the additional reference symbol is in the available state, for example, the two notification messages are carried in the same signaling to be sent to terminal, and the two notification messages may also be carried in different signaling to be sent to the terminal.

In some examples, the method further includes: indication information is sent to the terminal, the indication information being configured to indicate the terminal to send the first auxiliary information.

In the example of the present disclosure, the network device may indicate the terminal to report the first auxiliary information through the indication information, for example, the network device indicates the terminal to report the first auxiliary information, and then the terminal reports the first auxiliary information corresponding to the case that the use of the additional reference symbol is supported based on a capability state of the terminal. For example, the network device may indicate the terminal to report the corresponding auxiliary information in a case of indicating that the terminal supports the use of the additional reference symbol or in other cases.

In other examples, the terminal may also report the above first auxiliary information according to rules agreed by a protocol without being indicated by the network device. In addition, the terminal may further report the second auxiliary information based on the indication of the network device.

In some examples, sending the indication information to the terminal includes at least one of the following: broadcast signaling carrying the indication information is sent to the terminal, or dedicated signaling carrying the indication information is sent to the terminal.

In the example of the present disclosure, the above indication information may be carried in the broadcast signaling or the dedicated signaling. The dedicated signaling is signaling specifically configured to carry the indication information and send it to the terminal. When receiving the above broadcast signaling or the dedicated signaling, the terminal may read the indication information carried in the broadcast signaling or the dedicated signaling, and report the first auxiliary information based on the indication information.

In some examples, in response to the indication information being configured to indicate the terminal to support the additional reference symbol, the indication information is configured to implicitly indicate the terminal to send the first auxiliary information.

The above indication information may be information configured to indicate the terminal to support the additional reference symbol; it does not need to contain content that explicitly indicates the terminal to send the first auxiliary information, but it implicitly indicates the terminal to send the first auxiliary information. Thus, if the terminal receives the indication information, the corresponding first auxiliary information may be reported. If the terminal does not receive the indication information, it is not reported.

In some examples, in response to the indication information being configured to indicate the terminal to support the additional reference symbol and use of the power-saving signal, the indication information is configured to implicitly indicate the terminal to send the first auxiliary information.

The above indication information may be information configured to indicate the terminal to support the additional reference symbol and use of the power-saving signal, it does not need to contain content that explicitly indicates the terminal to send the first auxiliary information, but it implicitly indicates the terminal to send the first auxiliary information. Thus, if the terminal receives the indication information, the corresponding first auxiliary information may be reported. If the terminal does not receive the indication information, it is not reported.

In some examples, the method further includes at least one of the following: in a case of releasing the terminal, the first auxiliary information is sent by being carried in a terminal release message to a core network device; or the first auxiliary information is sent by being carried in a terminal capability information notification message to the core network device. Where the core network device is configured to carry the first auxiliary information in the paging message to send to the network device.

Here, the first auxiliary information reported by the terminal may be reported by the base station to a core network, and configuration information corresponding to the terminal is determined by a core network device. In the case of releasing the terminal, the base station may report the auxiliary information to the core network device by the terminal release message, or carry the auxiliary information in the terminal capability information notification message to report to the core network device.

When receiving the auxiliary information, the core network device may carry the auxiliary information in a paging message to send to a corresponding network device, and the network device may be a device such as a base station in a RAN, so that the corresponding base station in the RAN in a paging process may configure corresponding configuration information for a to-be-paged terminal based on the auxiliary information in the paging message.

The following example may further be provided by the example of the present disclosure: in a power-saving project of a 5G NR, a power-saving signal is introduced, where a wake-up signal (WUS) is a detection signal with low power consumption. If UE detects the WUS, it means that PDCCH monitoring is needed, and if the WUS is not detected, the PDCCH monitoring is skipped. In a scenario of configuring the DRX, the WUS may be configured before the DRX onduration, and if the UE does not detect the WUS, the whole onduration needs to be skipped. A frequency of skipping the onduration by the power-saving signal WUS may be 1 or an integer greater than 1, that is, every 1 or more DRX cycles correspond to 1 power-saving signal.

In narrowband communication, merely the application of the power-saving signal in the idle state may be considered. At this time, for a case that the auxiliary information supported by the power-saving signal is in a connected state, the UE reports it to the base station through UE-RadioPagingInfo, and then the base station notifies the core network device through a UE capacity info notification message sent to the core network device. Then, the core network device may add a UE radio capability for paging supported by the power-saving signal into a paging message sent to the RAN, where it contains the UE-RadioPagingInfo. The base station uses the capability information to configure an offset between the power-saving signal and the PO.

On this basis, it needs to consider the power saving of the idle state/inactive state, and then the WUS may also be configured before the PO. At this time, a gap between the WUS and the PO needs to meet AGC and time-frequency domain synchronization between the terminal and the network.

As shown in FIG. 7, a terminal device takes into account low power consumption and services with certain requirements for latency, in each eDRX cycle, merely in a set paging time window (PTW), a terminal may receive downlink data, in the rest of time, the terminal is in a sleeping state, and does not receive the downlink data, and the mode may achieve a balance between downlink service latency and power consumption, such as remotely shutting down gas services.

In each eDRX cycle, there is one paging time window (PTW), the terminal monitors a paging channel according to a DRX cycle (the DRX cycle is short in time, it may be considered that the terminal is non-sleeping, and it is reachable all the time) in the PTW, so as to receive the downlink data, and in the rest of the time, the terminal is in the sleeping state.

The eDRX cycle may assume that the terminal device is reachable at any time, but the latency is large, and the latency depends on the eDRX cycle configuration, which may achieve a balance between the lower power consumption and the latency.

In a power saving project, the idle state may use an additional TRS/CRS to assist a user in acquisition and time-frequency domain synchronization of the network, compared to original SSB synchronization, the TRS/CRS configuration may be configured to be closer to a PO time moment, the original SSB is far from a position of the PO, and thus, the user needs to be woken up in advance for a long time to synchronize with the SSB. After using the additional TRS/CRS, the user may be woken up later, and thus, more power may be saved. In the example of the present disclosure, a subsequent configuration mode for the power-saving signal is introduced based on an idle state TRS/CSI-RS characteristic.

In the example of the present disclosure, the terminal reports the supported auxiliary information for the power-saving signal when the additional reference symbol is introduced. The additional reference symbol may include the TRS, the CSI-RS, or the like, which is configured to assist the terminal in synchronization, RRS measurement, and the like.

The terminal reports the use of the power-saving signal in the inactive state and/or the idle state, the start and end time configuration of the power-saving signal may be an offset relative to a certain reference point, such as an offset relative to the paging occasion (PO), and the offset may be closely related to the implementation of the UE.

In some examples, the above terminal reporting the supported auxiliary information for the power-saving signal when the additional reference symbol is introduced may include: reporting respectively for cases of supporting the additional reference symbol and not supporting the additional reference symbol.

For example, the terminal may use the same signaling to report a capability to support the power-saving signal in the two cases of supporting and not supporting the additional reference symbol, and may also adopt different reporting messages to carry capabilities in the above two different cases for reporting.

In one example, the terminal may carry the above auxiliary information in the UE capacity information to report to the base station, for example, the auxiliary information is carried in a UE capability in UE-Radio PagingInfo to be reported to the base station.

In some examples, the terminal reporting the supported auxiliary information for the power-saving signal when the additional reference symbol is introduced may be based on indication of the base station: the base station notifies that whether the terminal supports to report the supported auxiliary information for the power-saving signal when the additional reference symbol is introduced; and a notification mode may be broadcast signaling or dedicated signaling.

In one example, if the base station notifies the terminal to support the additional reference symbol, it implicitly indicates that the terminal supports reporting the supported auxiliary information for the power-saving signal when the additional reference symbol is introduced.

In another example, if the base station notifies the terminal to support the additional reference symbol and the use of the power-saving signal, it implicitly informs that the terminal supports to report the supported auxiliary information for the power-saving signal when the additional reference symbol is introduced.

In the example of the present disclosure, when the auxiliary information provided by the UE to the core network device may be carried in UE releasing, the base station notifies the core network device through a releasing message sent to the core network device.

The auxiliary information provided by the UE to the core network device may also be carried in a UE capacity info notification message to be sent to the core network device through the base station to notify the core network device.

The core network device carries auxiliary information of a WUS used in the idle state/inactive state in a paging message sent to a RAN, and sends it to the RAN for power-saving signal configuration in the idle state/inactive state.

In the example of the present disclosure, an interactive message between base stations may carry the auxiliary information of the terminal; and the interactive message between the base stations includes: Retrieve UE Context Response or RAN Paging. Whether the Retrieve UE Context Response carries the auxiliary information may be that the request indication or protocol agreement for acquiring the information is added into the Retrieve UE Context Response based on a new base station.

As an example, it may be explicitly represented by a flag, for example, flag=1 means that the information needs to be requested.

In the example of the present disclosure, the base station configures the configuration information of the power-saving signal when the additional reference symbol is introduced:

if the base station may configure a set of power-saving signals for a case that introduction of the additional reference symbol is not configured, such as a power-saving signal 1, and meanwhile the power-saving signal configured for configuration of introduction of the additional reference symbol is issued, such as a power-saving signal 2.

For example, an offset 2 configured by the base station for the power-saving signal 2 needs to be not greater than an offset 1 configured by the base station for the power-saving signal 1.

In one example, the power-saving signal 2 is an optional configuration.

In the example of the present disclosure, the configuration of the power-saving signal 2 includes at least two of the following modes.

Mode 1: the base station may notify the user of configurations of the power-saving signal 2 and the power-saving signal 1 together, and its notification mode may be broadcast signaling, and certainly may also be dedicated signaling; or Mode 2: the base station may separately notify the user of the configuration of the power-saving signal 2, and its notification mode may be the dedicated signaling, and may also notify respectively through the broadcast signaling.

In the example of the present disclosure, a mode for confirming that the power-saving signal 2 is valid includes at least two of the following.

Mode 1: the power-saving signal 2 may be valid immediately after configuration, and at this time, the terminal may use the configuration immediately after obtaining the configuration; or Mode 2: the base station needs to notify that the power-saving signal 2 is valid.

As an example, the base station may notify that the power-saving signal 2 is valid while or after notifying the user that a state of the reference symbol is availability.

The availability of the reference symbol may be notified through a broadcast message, an RRC message, DCI, and the like.

In one example, notifying the availability of the reference symbol may imply that the power-saving signal 2 is valid.

In another example, an explicit indication may be configured to notify the terminal that the power-saving signal 2 is valid. For example, the explicit indication may be carried in the same message for notifying the availability of the reference symbol, and may also be carried in different messages.

In the example of the present disclosure, the terminal monitors the configured power-saving signal according to the following rules: if the terminal detects that the power-saving signal 2 is valid, the power-saving signal 2 may be used; and otherwise, it is returned back to use the power-saving signal 1.

In another example, the terminal may also monitor the configured power-saving signal based on the explicit indication of the base station.

As shown in FIG. 8, an example of the present disclosure further provides an apparatus 800 for determining a power-saving signal, including a sending module 801.

The sending module 801 is configured to send first auxiliary information of the apparatus in a case that use of an additional reference symbol is supported. The first auxiliary information is configured to determine a first power-saving signal supported by the apparatus, and the first power-saving signal is configured for the apparatus to monitor a paging message.

In some examples, the first power-saving signal is further configured for the apparatus to monitor the paging message in an inactive state and/or an idle state.

In some examples, the additional reference symbol is configured to assist in time-frequency domain synchronization between the apparatus and a network device, and the additional reference symbol includes at least one of the following: a phase reference signal (TRS), or a channel state information-reference signal (CSI-RS).

In some examples, the sending module 801 is further configured to send second auxiliary information of the apparatus in a case that the use of the additional reference symbol is not supported, the second auxiliary information being configured to determine a second power-saving signal.

In some examples, the sending module 801 is further configured to: send the capability reporting information to the network device, the capability reporting information including the first auxiliary information; and/or send the capability reporting information to the network device, the capability reporting information including the second auxiliary information.

In some examples, the apparatus 800 further includes: a receiving module (not shown), configured to receive configuration information sent by the network device according to the first auxiliary information and/or the second auxiliary information. The configuration information includes an offset of the power-saving signal relative to a paging occasion (PO).

In some examples, the configuration information is read by the apparatus from broadcast signaling of the network device, or the configuration information is read by the apparatus from dedicated signaling specifically configured to carry the configuration information.

In some examples, the configuration information includes: first configuration information configured to configure the first power-saving signal and/or second configuration information configured to configure the second power-saving signal which are carried in the same message; or, first configuration information carried in a separate message and configured to separately configure the first power-saving signal, and/or second configuration information carried in a separate message and configured to separately configure the second power-saving signal.

In some examples, the apparatus 800 further includes: a processing module (not shown), configured to: determine position information of the first power-saving signal according to the first configuration information; and/or determine position information of the second power-saving signal according to the second configuration information; and monitor the paging message according to the position information of the first power-saving signal and/or the position information of the second power-saving signal.

In some examples, the processing module is specifically configured to: determine, in response to receiving the first configuration information, that the first power-saving signal is valid; and determine, in response to the first power-saving signal being valid, the position information of the first power-saving signal according to the first configuration information.

In some examples, the processing module is specifically configured to: determine, in response to receiving a notification message notifying that the first power-saving signal is valid, that the first power-saving signal is valid; and determine, in response to the first power-saving signal being valid, the position information of the first power-saving signal according to the first configuration information.

In some examples, the processing module is specifically configured to: return, in response to the second power-saving signal being invalid, back to determine the position information of the second power-saving signal according to an offset corresponding to the second configuration information.

In some examples, the receiving module is further configured to: receive indication information of the network device; and the sending module 801 is further configured to: send, according to the indication information, the first configuration information of the apparatus in a case that the use of the additional reference symbol is supported by the network device.

In some examples, the receiving module is specifically configured to do at least one of the following: receiving broadcast signaling sent by the network device, and obtaining the indication information from the broadcast signaling; or receiving dedicated signaling specifically configured to carry the indication information sent by the network device, and obtaining the indication information from the dedicated signaling.

In some examples, the sending module 801 is further configured to do a situation where in response to the indication information being configured to indicate the apparatus to support the additional reference symbol, the apparatus sends, according to the indication information, the first auxiliary information of the apparatus in a case that the use of the additional reference symbol is supported.

In some examples, the sending module 801 is further configured to do a situation that in response to the indication information being configured to indicate the apparatus to support the additional reference symbol and use of the power-saving signal, the apparatus sends, according to the indication information, the first auxiliary information of the apparatus in a case that the use of the additional reference symbol is supported.

As shown in FIG. 9, an example of the present disclosure further provides an apparatus 900 for determining a power-saving signal, including a receiving module 901.

The receiving module 901 is configured to receive first auxiliary information of a terminal in a case that use of an additional reference symbol is supported. The first auxiliary information is configured to determine a first power-saving signal supported by the terminal, and the first power-saving signal is configured for the terminal to monitor a paging message.

In some examples, the first power-saving signal is further configured for the terminal to monitor the paging message in an inactive state and/or an idle state.

In some examples, the additional reference symbol is configured for time-frequency domain synchronization between the terminal and the apparatus, and the additional reference symbol includes at least one of the following: a TRS, or a CSI-RS.

In some examples, the receiving module 901 is further configured to: receive second auxiliary information of the terminal in a case that the use of the additional reference symbol is not supported. The second auxiliary information is configured to determine a second power-saving signal.

In some examples, the apparatus 900 further includes: a sending module (not shown), configured to send configuration information according to the first auxiliary information and/or the second auxiliary information. The configuration information, including an offset of the power-saving signal relative to a PO.

In some examples, the sending module is specifically configured to: send the configuration information through broadcast signaling according to the first auxiliary information and/or the second auxiliary information; or send the configuration information through the dedicated signaling specifically configured to carry the configuration information according to the first auxiliary information and/or the second auxiliary information.

In some examples, the sending module is specifically configured to do at least one of the following: sending the same message carrying the first configuration information of the first power-saving signal and the second configuration information of the second power-saving signal for synchronous configuration to the terminal; or sending a message carrying the first configuration information for separately configuring the first power-saving signal, and/or sending a message carrying the second configuration information for separately configuring the second power-saving signal to the terminal.

In some examples, the sending module is further configured to: send, in response to the configuration information at least including the first configuration information, a notification message notifying that the first power-saving signal is valid to the terminal; and/or send, in response to the configuration information at least including the first configuration information, a notification message notifying that the additional reference symbol is in an available state to the terminal, where the notification message notifying that the additional reference symbol is in the available state implicitly indicates that the first power-saving signal is valid.

In some examples, the sending module is further configured to: send, in response to the configuration information, at least including the first configuration information, the notification message notifying that the additional reference symbol is in the available state to the terminal, and send the notification message notifying that the first power-saving signal is valid to the terminal.

In some examples, the sending module is further configured to: send indication information to the terminal, the indication information being configured to indicate the terminal to send the first auxiliary information.

In some examples, the sending module is specifically configured to do at least one of the following: sending broadcast signaling carrying the indication information to the terminal; and sending dedicated signaling carrying the indication information to the terminal.

In some examples, in response to the indication information being configured to indicate the terminal to support the additional reference symbol, the indication information is configured to implicitly indicate the terminal to send the first auxiliary information.

In some examples, in response to the indication information being configured to indicate the terminal to support the additional reference symbol and use of the power-saving signal, the indication information is configured to implicitly indicate the terminal to send the first auxiliary information.

In some examples, the sending module is further configured to: send, in a case of releasing of the terminal, the first auxiliary information by being carried in a terminal release message to a core network device; and/or send the first auxiliary information by being carried in a terminal capability information notification message to the core network device. Where the core network device is configured to carry the first auxiliary information in the paging message to send to the network device.

As for the apparatus 900 in the above examples, the specific manner in which each module performs operations has been described in detail in the examples of the method, and detailed description will not be given here.

Figure 10:
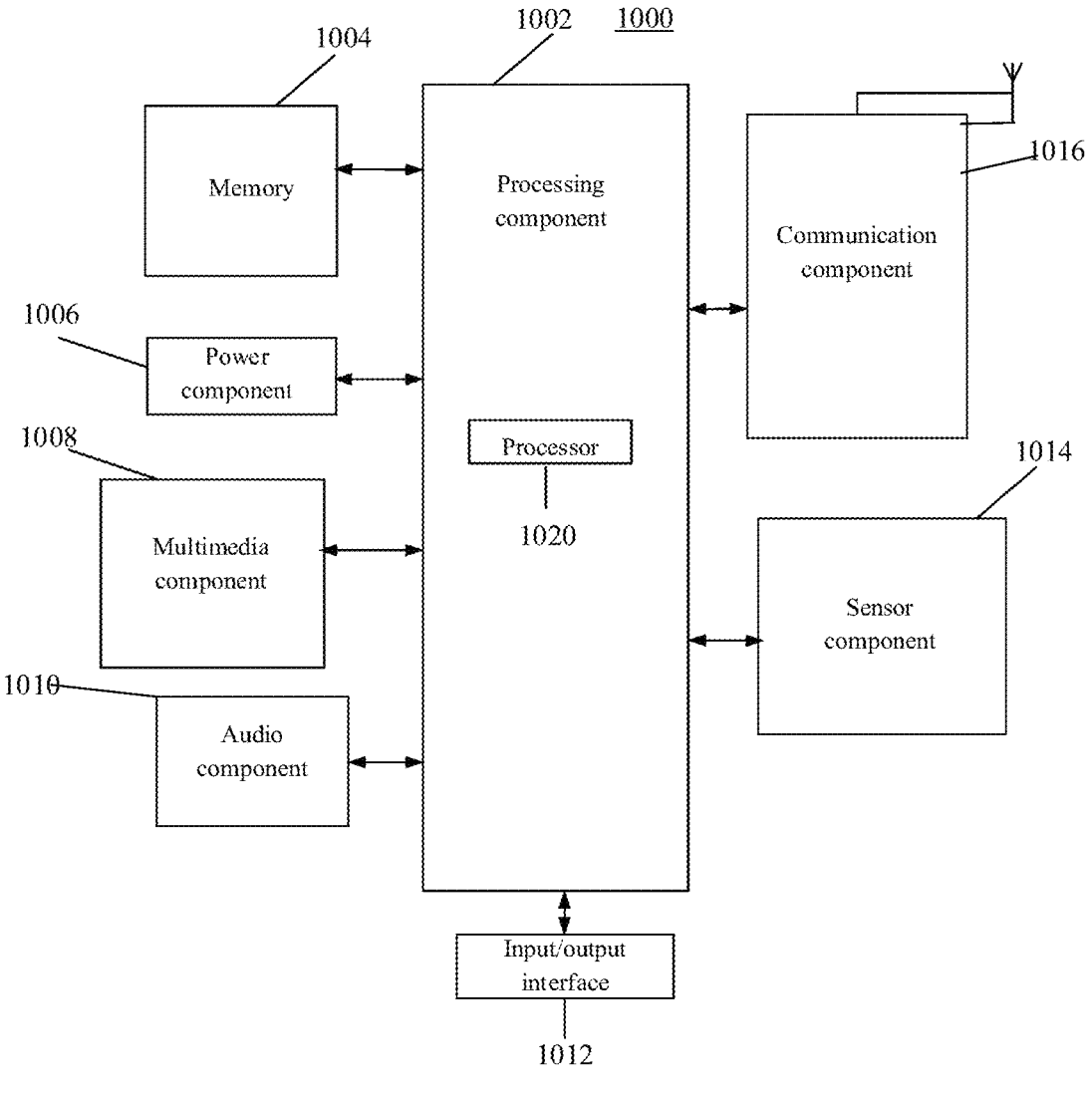
FIG. 10 is a first schematic structural diagram of a communication device illustrated according to an example.

FIG. 10 is a structural block diagram of a communication device 1000 provided by an example of the present disclosure. The communication device 1000 may be a terminal. For example, the communication device 1000 may be a mobile phone, a computer, digital broadcasting user equipment, a messaging device, a game console, a tablet device, a medical device, a fitness device, a personal digital assistant, etc.

Referring to FIG. 10, the communication device 1000 may include at least one of the following components: a processing component 1002, a memory 1004, a power component 1006, a multimedia component 1008, an audio component 1100, an input/output (I/O) interface 1012, a sensor component 1014, and a communication component 1016.

The processing component 1002 typically controls the overall operation of the communication device 1000, such as operations associated with display, telephone calls, data communication, camera operations, and recording operations. The processing component 1002 may include at least one processor 1020 to execute instructions to complete all or part of the steps of the above method. In addition, the processing component 1002 may include at least one module to facilitate interaction between the processing component 1002 and other components. For example, the processing component 1002 may include a multimedia module to facilitate interaction between the multimedia component 1008 and the processing component 1002.

The memory 1004 is configured to store various types of data to support operations at the communication device 1000. Instances of these data include instructions for any application or method operating on the communication device 1000, contact data, phonebook data, messages, pictures, videos, etc. The memory 1004 may be implemented by any type of volatile or nonvolatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1006 provides power for various components of the communication device 1000. The power component 1006 may include a power management system, at least one power source and other components associated with generating, managing and distributing power for the communication device 1000.

The multimedia component 1008 includes a screen providing an output interface between the communication device 1000 and a user. In some examples, the screen may include a liquid crystal display (LCD) and a touch panel (TP). If the screen includes the touch panel, the screen may be implemented as a touch screen to receive an input signal from the user. The touch panel includes at least one touch sensor to sense touch, sliding and gestures on the touch panel. The touch sensor may not merely sense the boundary of the touch or sliding action, but also detect the wake-up time and pressure related to the touch or sliding operation. In some examples, the multimedia component 1008 includes a front camera and/or a rear camera. When the communication device 1000 is in an operation mode, such as a shooting mode or a video mode, the front camera and/or the rear camera can receive external multimedia data. Each front camera and rear camera can be a fixed optical lens system or have a focal length and optical zoom capability.

The audio component 1100 is configured to output and/or input audio signals. For example, the audio component 1100 includes a microphone (MIC) configured to receive an external audio signal when the communication device 1000 is in the operation mode, such as a call mode, a recording mode, and a speech recognition mode. The received audio signal may be further stored in the memory 1004 or transmitted via the communication component 1016. In some examples, the audio component 1100 further includes a speaker for outputting an audio signal.

The I/O interface 1012 provides an interface between the processing component 1002 and a peripheral interface module which may be a keyboard, a click wheel, a button, etc. These buttons may include, but are not limited to: a home button, volume buttons, a start button and a lock button.

The sensor component 1014 includes at least one sensor for providing state evaluation of various aspects of the communication device 1000. For example, the sensor component 1014 may detect an open/close state of the device 1000 and relative positioning of the components, for example, the components are a display and a keypad of the communication device 1000. The sensor component 1014 may further detect changes in a position of the communication device 1000 or a component of the communication device 1000, the presence or absence of contact between the user and the communication device 1000, azimuth or acceleration/deceleration of the communication device 1000, and temperature changes of the communication device 1000.

The sensor component 1014 may include a proximity sensor configured to detect the presence of nearby objects without any physical contact. The sensor component 1014 may further include an optical sensor, such as a CMOS or CCD image sensor, for use in imaging applications. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the communication device 1000 and other devices. The communication device 1000 may access a wireless network based on a communication standard, such as Wi-Fi, 2G or 3G, or their combination. In an example, the communication component 1016 receives a broadcast signal or broadcast-related information from an external broadcast management system via a broadcast channel. In an example, the communication component 1016 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the communication device 1000 may be implemented by at least one application specific integrated circuit (ASIC), digital signal processor (DSP), digital signal processing device (DSPD), programmable logic device (PLD), field programmable gate array (FPGA), controller, microcontroller, microprocessor, or other electronic elements for executing the above method.

In an example, a non-transitory computer readable storage medium including instructions is further provided, such as the memory 1004 including instructions, which can be executed by the processor 1020 of the communication device 1000 to complete the above method. For example, the non-transitory computer readable storage medium may be an ROM, a random access memory (RAM), a CD-ROM, a magnetic tape, a floppy disk, an optical data storage device, etc.

Figure 11:
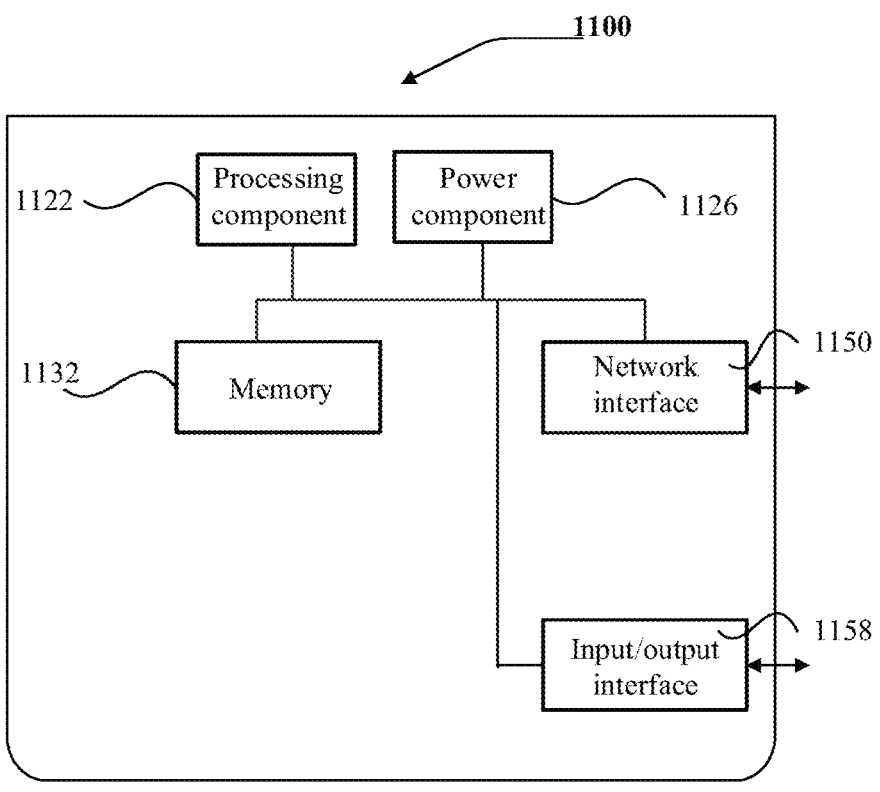
FIG. 11 is a second schematic structural diagram of a communication device illustrated according to an example.

As shown in FIG. 11, an example of the present disclosure illustrates a structure of another communication device 1100. The communication device 1100 may be the network device such as the base station or the core network device mentioned in the examples of the present disclosure. For example, the communication device 1100 may be provided as a network device. Referring to FIG. 11, the communication device 1100 includes a processing component 1122, which further includes at least one processor (not shown), and a memory resource represented by a memory 1132, which is configured to store instructions, such as applications, executable by the processing component 1122. The applications stored in the memory 1132 may include one or more modules each corresponding to a set of instructions. In addition, the processing component 1122 is configured to execute instructions to execute any of the methods performed by the communication device 1100.

The communication device 1100 may further include the power component 1126 configured to execute power management of the communication device 1100, a wired or wireless network interface 1150 configured to connect the communication device 1100 to the network, and an input/output (I/O) interface 1158. The communication device 1100 may operate an operating system stored in the memory 1132, such as Windows Server™, Mac OS X™, Unix™, Linux™, FreeBSD™ or the like.

Other implementation solutions of the present disclosure will be apparent to those skilled in the art from consideration of the specification and practice of the present disclosure here. The present disclosure is intended to cover any variations, uses, or adaptations of the present disclosure following the general principles of the present disclosure and including such departures from the present disclosure as come within known or customary practice in the art. It is intended that the specification and examples are considered as examples merely, with a true scope and spirit of the present disclosure being indicated by the following claims.

It will be appreciated that the present disclosure is not limited to the exact construction that has been described above and illustrated in the accompanying drawings, and that various modifications and changes may be made without departing from its scope. It is intended that the scope of the present disclosure is merely limited by the appended claims.

According to a first aspect of an example of the present disclosure, a method for determining a power-saving signal is provided and performed by a terminal, including: sending first auxiliary information of the terminal in a case that use of an additional reference symbol is supported, the first auxiliary information being configured to determine a first power-saving signal supported by the terminal, and the first power-saving signal being configured for the terminal to monitor a paging message.

In some examples, the first power-saving signal is further configured for the terminal to monitor the paging message in an inactive state and/or an idle state.

In some examples, the additional reference symbol is configured to assist in time-frequency domain synchronization between the terminal and a network device, and the additional reference symbol includes at least one of the following: a phase reference signal (TRS); or a channel state information-reference signal (CSI-RS).

In some examples, the method further includes: sending second auxiliary information of the terminal in a case that the use of the additional reference symbol is not supported, the second auxiliary information being configured to determine a second power-saving signal.

In some examples, sending the first auxiliary information includes: sending capability reporting information to a network device, the capability reporting information including the first auxiliary information; and sending the second auxiliary information includes: sending the capability reporting information to the network device, the capability reporting information including the second auxiliary information.

In some examples, the method further includes: receiving configuration information sent by the network device according to the first auxiliary information and/or the second auxiliary information, the configuration information including an offset of the power-saving signal relative to a paging occasion (PO).

In some examples, the configuration information is read by the terminal from broadcast signaling of the network device, or the configuration information is read by the terminal from dedicated signaling specifically configured to carry the configuration information.

In some examples, the configuration information includes: first configuration information of the first power-saving signal and/or second configuration information of the second power-saving signal.

In some examples, the method further includes: determining position information of the first power-saving signal according to the first configuration information; and/or determining position information of the second power-saving signal according to the second configuration information; and monitoring the paging message according to the position information of the first power-saving signal and/or the position information of the second power-saving signal.

In some examples, determining the position information of the first power-saving signal according to the first configuration information includes: determining, in response to receiving the first configuration information, that the first power-saving signal is valid; and determining, in response to the first power-saving signal being valid, the position information of the first power-saving signal according to the first configuration information.

In some examples, determining the position information of the first power-saving signal according to the first configuration information includes: determining, in response to receiving a notification message notifying that the first power-saving signal is valid, that the first power-saving signal is valid; and determining, in response to the first power-saving signal being valid, the position information of the first power-saving signal according to the first configuration information.

In some examples, the method further includes: returning, in response to the first power-saving signal being invalid, back to determine the position information of the second power-saving signal according to an offset corresponding to the second configuration information.

In some examples, the method further includes: receiving indication information of the network device.

Sending the first auxiliary information of the terminal in a case that the use of the additional reference symbol is supported includes: sending, according to the indication information, the first auxiliary information of the terminal in a case that the use of the additional reference symbol is supported to the network device.

In some examples, receiving the indication information of the network device includes at least one of the following: receiving broadcast signaling sent by the network device, and obtaining the indication information from the broadcast signaling; or receiving dedicated signaling specifically configured to carry the indication information sent by the network device, and obtaining the indication information from the dedicated signaling.

In some examples, the terminal sends, in response to the indication information being configured to indicate the terminal that the additional reference symbol is supported, according to the indication information, the first auxiliary information of the terminal in a case that the use of the additional reference symbol is supported.

In some examples, the terminal sends, in response to the indication information being configured to indicate the terminal that the additional reference symbol and use of the power-saving signal are supported, according to the indication information, the first auxiliary information of the terminal in a case that the use of the additional reference symbol is supported.

According to a second aspect of an example of the present disclosure, a method for determining a power-saving signal is provided and performed by a network device, including: receiving, first auxiliary information of a terminal in a case that use of an additional reference symbol is supported, the first auxiliary information being configured to determine a first power-saving signal supported by the terminal, and the first power-saving signal being configured for the terminal to monitor a paging message.

In some examples, the first power-saving signal is further configured for the terminal to monitor the paging message in an inactive state and/or an idle state.

In some examples, the additional reference symbol is configured for time-frequency domain synchronization between the terminal and the network device, and the additional reference symbol includes at least one of the following: a tracking reference signal (TRS); or a channel state information-reference signal (CSI-RS).

In some examples, the method further includes: receiving second auxiliary information of the terminal in a case that the use of the additional reference symbol is not supported, the second auxiliary information being configured to determine a second power-saving signal.

In some examples, the method further includes: sending configuration information according to the first auxiliary information and/or the second auxiliary information, the configuration information including an offset of the power-saving signal relative to a paging occasion (PO).

In some examples, sending the configuration information according to the first auxiliary information and/or the second auxiliary information includes at least one of the following: sending, according to the first auxiliary information and/or the second auxiliary information, the configuration information through broadcast signaling; or sending, according to the first auxiliary information and/or the second auxiliary information, the configuration information through the dedicated signaling specifically configured to carry the configuration information.

In some examples, the configuration information includes: first configuration information of the first power-saving signal and/or second configuration information of the second power-saving signal.

In some examples, the method further includes at least one of the following: sending, in response to the configuration information at least including the first configuration information, a notification message notifying that the first power-saving signal is valid to the terminal; or sending, in response to the configuration information at least including the first configuration information, a notification message notifying that the additional reference symbol is in an available state to the terminal, where the notification message notifying that the additional reference symbol is in the available state implicitly indicates that the first power-saving signal is valid.

In some examples, sending, in response to the configuration information at least including the first configuration information, the notification message notifying that the first power-saving signal is valid to the terminal includes: sending, in response to the configuration information at least including the first configuration information, the notification message notifying that the additional reference symbol is in the available state to the terminal, and sending the notification message notifying that the first power-saving signal is valid to the terminal.

In some examples, the method further includes: sending indication information to the terminal, the indication information being configured to indicate the terminal to send the first auxiliary information.

In some examples, sending the indication information to the terminal includes at least one of the following: sending broadcast signaling carrying the indication information to the terminal; or sending dedicated signaling carrying the indication information to the terminal.

In some examples, configuring, in response to the indication information being configured to indicate the terminal to support the additional reference symbol, the indication information to implicitly indicate the terminal to send the first auxiliary information.

In some examples, configuring, in response to the indication information being configured to indicate the terminal to support the additional reference symbol and use of the power-saving signal, the indication information to implicitly indicate the terminal to send the first auxiliary information.

In some examples, the method further includes at least one of the following: sending, in a case of releasing of the terminal, the first auxiliary information by being carried in a terminal release message to a core network device; or sending the first auxiliary information by being carried in a terminal capability information notification message to the core network device, where the core network device is configured to carry the first auxiliary information in the paging message to send to the network device.

According to a third aspect of an example of the present disclosure, an apparatus for determining a power-saving signal is provided and applied to a terminal, including: a sending module, configured to send first auxiliary information of the terminal in a case that use of an additional reference symbol is supported, the first auxiliary information being configured to determine a first power-saving signal supported by the terminal, and the first power-saving signal being configured for the terminal to monitor a paging message.

According to a fourth aspect of an example of the present disclosure, an apparatus for determining a power-saving signal is provided and applied to a network device, including: a receiving module, configured to receive first auxiliary information of a terminal in a case that use of an additional reference symbol is supported, the first auxiliary information being configured to determine a first power-saving signal supported by the terminal, and the first power-saving signal being configured for the terminal to monitor a paging message.

According to a fifth aspect of an example of the present disclosure, a communication device is provided, at least including: a processor and an interface circuit; the interface circuit is configured to receive and transmit code instructions to the processor; and the processor is configured to run the code instructions to execute steps in any above method.

According to a sixth aspect of an example of the present disclosure, a non-transitory computer readable storage medium is provided, storing a computer-executable instruction, and the instruction, when executed, is configured to implement steps in any above method.

The example of the present disclosure provides the method for determining the power-saving signal, the terminal sends the first auxiliary information of the power-saving signal supported by the terminal in a case that the use of the additional reference symbol is supported, which is distinguished from a case that the use of the additional reference symbol is not supported, so that the terminal may cooperate with the additional reference symbol to monitor the power-saving signal, and more power can be saved.

What is claimed is:

1. A method for determining a power-saving signal, comprising:

sending first auxiliary information of a terminal in a case that use of an additional reference symbol is supported, the first auxiliary information being configured to determine a first power-saving signal supported by the terminal, and the first power-saving signal being configured for the terminal to monitor a paging message, wherein the first power-saving signal is further configured for the terminal to monitor the paging message in an inactive state and/or an idle state, and wherein the additional reference symbol is configured to assist in time-frequency domain synchronization between the terminal and a network device.

2. The method according to claim 1, further comprising:

sending second auxiliary information of the terminal in a case that the use of the additional reference symbol is not supported, the second auxiliary information being configured to determine a second power-saving signal.

3. The method according to claim 2, further comprising:

receiving configuration information sent by a network device according to the first auxiliary information and/or the second auxiliary information, the configuration information including an offset of the first power-saving signal and/or the second power-saving signal relative to a paging occasion (PO).

4. The method according to claim 3, wherein the configuration information is carried in broadcast signaling of the network device, or the configuration information is carried in dedicated signaling.

5. The method according to claim 3, wherein the configuration information comprises first configuration information of the first power-saving signal and/or second configuration information of the second power-saving signal.

6. The method according to claim 5, further comprising at least one of the following:

determining position information of the first power-saving signal according to the first configuration information; or determining position information of the second power-saving signal according to the second configuration information; or monitoring the paging message according to the position information of the first power-saving signal and/or the position information of the second power-saving signal.

7. The method according to claim 6, wherein determining the position information of the first power-saving signal according to the first configuration information comprises:

determining, in response to receiving the first configuration information, that the first power-saving signal is valid; and determining, in response to the first power-saving signal being valid, the position information of the first power-saving signal according to the first configuration information.

8. The method according to claim 6, wherein determining the position information of the first power-saving signal according to the first configuration information comprises:

determining, in response to receiving a notification message notifying that the first power-saving signal is valid, that the first power-saving signal is valid; and determining, in response to the first power-saving signal being valid, the position information of the first power-saving signal according to the first configuration information.

9. The method according to claim 6, further comprising:

returning, in response to the first power-saving signal being invalid, back to determine the position information of the second power-saving signal according to an offset corresponding to the second configuration information.

10. The method according to claim 1, further comprising:

receiving indication information of the network device, wherein the indication information being configured to indicate the terminal that the additional reference symbol is supported; or wherein the indication information being configured to indicate the terminal that the additional reference symbol and use of the first power-saving signal and/or the second power-saving signal are supported.

11. A method for determining a power-saving signal, comprising:

receiving, first auxiliary information of a terminal in a case that use of an additional reference symbol is supported, the first auxiliary information being configured to determine a first power-saving signal supported by the terminal, and the first power-saving signal being configured for the terminal to monitor a paging message, wherein the first power-saving signal is further configured for the terminal to monitor the paging message in an inactive state and/or an idle state, and wherein the additional reference symbol is configured to assist in time-frequency domain synchronization between the terminal and a network device.

12. The method according to claim 11, further comprising:

receiving second auxiliary information of the terminal in a case that the use of the additional reference symbol is not supported, the second auxiliary information being configured to determine a second power-saving signal.

13. The method according to claim 12, further comprising:

sending configuration information according to the first auxiliary information and/or the second auxiliary information, the configuration information comprising an offset of the first power-saving signal and/or the second power-saving signal relative to a paging occasion (PO).

14. The method according to claim 13, wherein sending the configuration information according to the first auxiliary information and/or the second auxiliary information, comprises at least one of the following:

sending, according to the first auxiliary information and/or the second auxiliary information, the configuration information through broadcast signaling; or sending, according to the first auxiliary information and/or the second auxiliary information, the configuration information through dedicated signaling specifically configured to carry the configuration information.

15. The method according to claim 13, wherein the configuration information comprises:

first configuration information of the first power-saving signal and/or second configuration information of the second power-saving signal.

16. The method according to claim 15, further comprising at least one of the following:

sending, in response to the configuration information at least comprising the first configuration information, a notification message notifying that the first power-saving signal is valid to the terminal; or sending, in response to the configuration information at least comprising the first configuration information, a notification message notifying that the additional reference symbol is in an available state to the terminal, wherein the notification message notifying that the additional reference symbol is in the available state implicitly indicates that the first power-saving signal is valid.

17. The method according to claim 16, wherein sending, in response to the configuration information at least comprising the first configuration information, the notification message notifying that the first power-saving signal is valid to the terminal comprises:

sending, in response to the configuration information at least comprising the first configuration information, the notification message notifying that the additional reference symbol is in the available state to the terminal, and sending a notification message notifying that the first power-saving signal is valid to the terminal.

18. The method according to claim 11, further comprising:

sending indication information to the terminal, the indication information being configured to indicate the terminal to send the first auxiliary information.

19. A communication device, at least comprising: a processor and an interface circuit;

wherein the interface circuit is configured to receive and transmit code instructions to the processor; and the processor is configured to:

send first auxiliary information of a terminal in a case that use of an additional reference symbol is supported, the first auxiliary information being configured to determine a first power-saving signal supported by the terminal, and the first power-saving signal being configured for the terminal to monitor a paging message, wherein the first power-saving signal is further configured for the terminal to monitor the paging message in an inactive state and/or an idle state, and wherein the additional reference symbol is configured to assist in time-frequency domain synchronization between the terminal and a network device.

20. A communication device, at least comprising:

a processor and an interface circuit;

wherein the interface circuit is configured to receive and transmit code instructions to the processor, and wherein the processor is configured to run the code instructions to execute steps in the method provided by claim 11.

\*　　\*　　\*　　\*　　\*